(12) United States Patent
Chang et al.

(10) Patent No.: US 9,256,958 B2
(45) Date of Patent: Feb. 9, 2016

(54) ACTIVE ATTENTIONAL SAMPLING METHOD FOR ACCELERATING BACKGROUND SUBTRACTION

(71) Applicants: Hyung-Jin Chang, Seoul (KR); Ha-Wook Jeong, Seoul (KR); Jin-Young Choi, Seoul (KR)

(72) Inventors: Hyung-Jin Chang, Seoul (KR); Ha-Wook Jeong, Seoul (KR); Jin-Young Choi, Seoul (KR)

(73) Assignee: SNU R&DB FOUNDATION, Gwanak-Ro, Gwanak-Gu, Seoul (KR)

( * ) Notice: Subject to any disclaimer, the term of this patent is extended or adjusted under 35 U.S.C. 154(b) by 0 days.

(21) Appl. No.: 14/109,788

(22) Filed: Dec. 17, 2013

(65) Prior Publication Data

US 2015/0170374 A1 Jun. 18, 2015

(51) Int. Cl.
*G06T 7/20* (2006.01)
*G06K 9/32* (2006.01)
*G06T 7/00* (2006.01)
*G06K 9/00* (2006.01)

(52) U.S. Cl.
CPC .......... *G06T 7/2053* (2013.01); *G06K 9/00771* (2013.01); *G06K 9/3233* (2013.01); *G06T 7/0081* (2013.01); *G06T 7/0087* (2013.01); *G06T 7/2006* (2013.01); *G06T 2207/10016* (2013.01); *G06T 2207/20076* (2013.01); *G06T 2207/20144* (2013.01); *G06T 2207/30232* (2013.01)

(58) Field of Classification Search
CPC ... G06T 7/2053; G06T 7/0087; G06T 7/2006; G06T 7/0081; G06T 2207/10016; G06T 2207/20076; G06T 2207/20144; G06T 2207/30232; G06K 9/00771; G06K 9/00805; G06K 9/3233
See application file for complete search history.

(56) References Cited

U.S. PATENT DOCUMENTS

| | | | | | |
|---|---|---|---|---|---|
| 5,268,967 | A | * | 12/1993 | Jang et al. | 382/132 |
| 6,721,446 | B1 | * | 4/2004 | Wilensky et al. | 382/162 |
| 7,280,673 | B2 | * | 10/2007 | Buehler et al. | 382/103 |
| 7,336,803 | B2 | * | 2/2008 | Mittal et al. | 382/103 |
| 7,925,152 | B2 | * | 4/2011 | Lien et al. | 396/213 |

* cited by examiner

*Primary Examiner* — Manav Seth
(74) *Attorney, Agent, or Firm* — John K. Park; Park Law Firm

(57) ABSTRACT

An active attentional sampling technology for accelerating background subtraction from input videos, more specifically, an active attentional sampling technology for accelerating background subtraction by removing background region from the input video and then applying foreground probability map and sampling mask according to temporal property, spatial property and frequency property of the input video in favor of the pixel-wise background subtraction algorithm is provided. The background subtraction is accomplished by generating active attentional sampling mask for input video and then processing each frame of the input video only for regions corresponding to the sampling mask, which renders the background subtraction be much accelerated. That is, the present invention successfully speeds up pixel-wise background subtraction methods approximately 6.6 times without deteriorating detection performance. Therefore, according to the present invention, real-time detection with full-HD video is successfully achieved through various conventional background subtraction algorithms.

22 Claims, 6 Drawing Sheets
(2 of 6 Drawing Sheet(s) Filed in Color)

(a) $r^t = 1, k = 1$  (b) $r^t = P_{BG}^t, k = 1$  (b) $r^t = P_{BG}^t, k = \sqrt{3}$ Park et al.: A. Tabb, and A. C. Kak. Hierarchical data structure for real-time background subtraction.
IEEE ICIP. 2006

Kim et al.: H. -K. Kim, Suryanto. D. -H. Kim, D. Zhang. and S. -J. Ko. Fast object detection method for
visual surveillance. In IEEE ITC-CSCC 2008. 2008

Lee et al,: D. -Y. Lee, J. -K. ahn. and C - S. Kim. Fast background subtraction algorithm using
two-level sampling and silhouette detection. IEEE ICIP, Nov. 2009.

ACTIVE ATTENTIONAL SAMPLING METHOD FOR ACCELERATING BACKGROUND SUBTRACTION

BACKGROUND OF THE INVENTION

The present invention generally relates to an active attentional sampling technology for accelerating background subtraction from input videos. More specifically, the present invention relates to an active attentional sampling technology for accelerating background subtraction by removing background region from the input video and then applying foreground probability map and sampling mask according to temporal property, spatial property and frequency property of the input video in favor of the pixel-wise background subtraction algorithm.

The background subtraction algorithm is a process which aims to segment moving foreground objects from input video with subtracting background region. As computer vision technology is getting developed, computation time reduction issue in background subtraction algorithm becomes important in a systematic view, because the background subtraction is generally considered as a low-level image processing task to be processed with little computation. Further, the recent trend of bigger video sizes makes the computation time reduction issue more desperate.

Recently, background subtraction technology of pixel-based probabilistic model methods gained lots of interests and have shown good detection results. There have been many improvements in detection performance for these methods under various situations. However, heavy computation load of these methods results in long computation time, which renders real-time application impractical. Therefore, several approaches have been studied in order to reduce computation time of background subtraction algorithm.

The first type of approach is based on optimizing algorithms. The Gaussian mixture model (GMM) scheme proposed by Stauffer and Grimson works well for various environments. However, the GMM scheme shows slow learning rates and heavy computational load for each frame. D.-S. Lee, "Effective Gaussian mixture learning for video background subtraction," TPAMI, 2005 made the convergence faster by using a modified schedule that gradually switches between two stage learning schemes. Z. Zivkovic and F. van der Heijden, "Efficient adaptive density estimation per image pixel for the task of background subtraction," Patten Recognition Letters, 2006 achieved a significant speed-up by formulating a Bayesian approach to select the required number of Gaussian modes for each pixel in the scene. P. Gorur and B. Amrutur, "Speeded up gaussian mixture model algorithm for background subtraction," AVSS 2011 modified Zivkovic's method by windowed weight update that minimizes floating point computations.

The second type of approach is using parallel computation in which multi-core processors using OpenMP or GPU are applied in a parallel form for enhancing computation speed. V. Pham et al., "GPU implementation of extended Gaussian mixture model for background subtraction," IEEE RIVF, 2010 performed real-time detection even in full HD video using GPU. The second type of approach has successfully achieved speed enhancement, but requires parallel-processing hardware resources.

The third type of approach is using selective sampling. J. Park et al., "Hierarchical data structure for real-time background subtraction," IEEE ICIP, 2006 proposed a hierarchical quad-tree structure to decompose an input image, by which computational complexity reduction is achieved. However, their algorithm may miss small objects because they randomly sample from a relatively large region. H.-K Kim et al., "Fast object detection method for visual surveillance," IEEE ITC-CSCC 2008 presented a sampling mask designing method which can be readily applied to many conventional object detection algorithms. D.-Y. Lee et al., "Fast background subtraction algorithm using two-level sampling and silhouette detection," IEEE ICIP, 2009 also proposed a two-level pixel sampling method. Their algorithms provide accurate segmentation results without flickering artifacts. However, these grid patterns still cause redundant operations in their algorithms.

SUMMARY OF THE INVENTION

It is an object of the present invention to provide an active attentional sampling method for accelerating background subtraction from input videos. More specifically, it is an object of the present invention to provide an active attentional sampling technology for accelerating background subtraction by removing background region from the input video and then applying foreground probability map and sampling mask according to temporal property, spatial property and frequency property of the input video in favor of the pixel-wise background subtraction algorithm.

According to the present invention, there is provided an active attentional sampling method for accelerating background subtraction for video, which comprising: (a) obtaining temporal property, spatial property and frequency property of foreground for the video in order to obtain active sampling mask for accelerating background subtraction; (b) generating foreground probability map $P_{FG}$ based on the temporal, spatial and frequency properties; and (c) generating sampling mask $M^t$ for each frame based on the foreground probability map $P_{FG}$ and detection mask D which is the result of foreground detection so as to perform selective pixel-wise background subtraction for the sampling mask $M^t$.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

As the color drawings are being filed electronically via EFS-Web, only one set of the drawings is submitted.

DESCRIPTION OF SPECIFIC EMBODIMENTS

Exemplary embodiments of the present invention will be described below in more detail with reference to the accompanying drawings.

The active attentional sampling method of the present invention is designed based on the selective attention mechanism of human in which previously recognized results are reflected in the focusing position of current frame. For example, when a guard monitors CCTV cameras, he does not concentrate on whole of the image. Rather, he has empirically learned that such video images can be categorized into background region (stationary region), unimportant dynamic scene region, and important moving object appearing region. Then he takes his attention to the regions which have moving object appearing intentionally and does a sparse scanning to the other regions such as background or dynamic region. The present invention is to simulate this selective attention scheme.

In general, most of pixels from surveillance video are background region, and foreground region takes very small portion in both spatially and temporally. The proportion of the foreground area in the data sets which are commonly used in conventional references is measured as Table 1.

TABLE 1

| Data Set | The number of tested frames | Mean (%) | Standard Variance |
|---|---|---|---|
| Wallflower | 7553 | 5.03 | 6.25 |
| VSSN2006 | 16074 | 2.30 | 1.13 |
| PETS2006 | 41194 | 1.04 | 0.26 |
| AVSS2007 | 33000 | 3.36 | 1.02 |
| PETS2009 | 2581 | 5.48 | 1.58 |
| SABS | 6400 | 2.42 | 1.83 |
| Average |  | 2.42 | 1.18 |

The data sets in Table 1 are Wallflower, VSSN2006, PETS2006, AVSS2007 i-LIDS challenge, PETS2009 and SABS. In general, the proportions of foreground regions are measured very small, e.g., 2.42%. Therefore, if background subtraction focuses on foreground region, the computation load of the background subtraction can be significantly reduced. The present invention is to find attentional region in a current frame based on the foreground region detected in a previous frame.

The present invention is described below in more detail with reference to the accompanying drawings.

Figure 1:
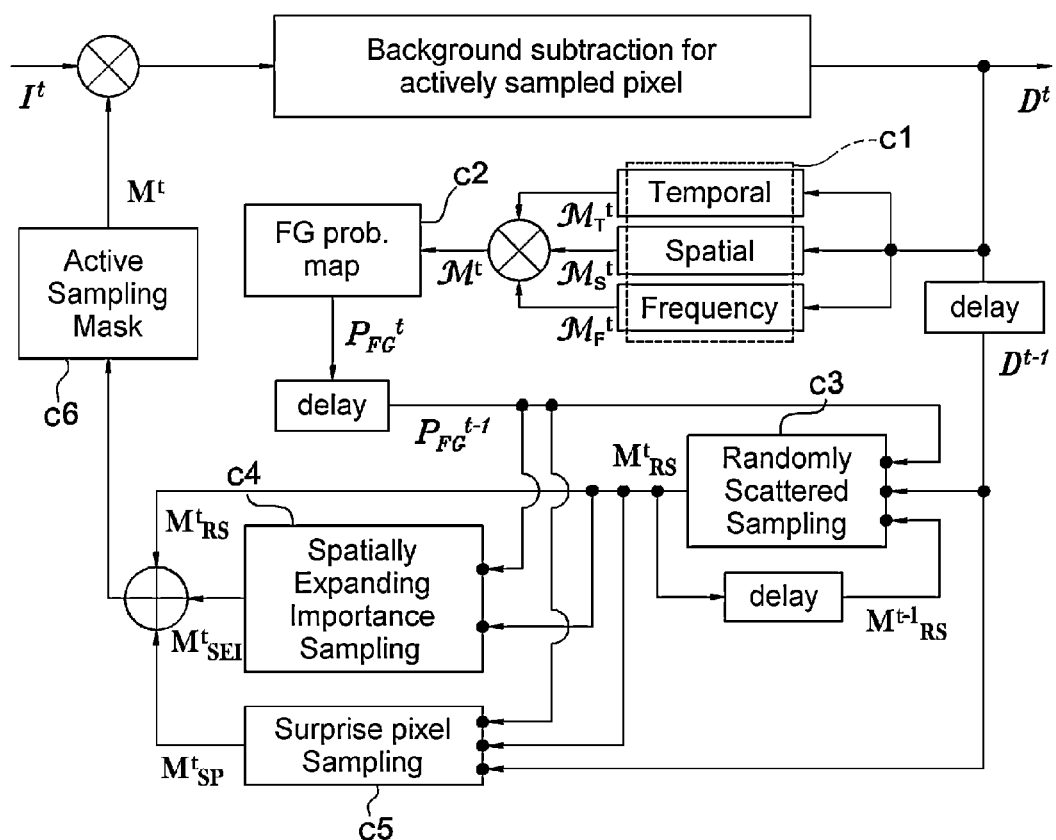
FIG. 1 shows overall scheme of the active attentional sampling method according to the present invention.

FIG. 1 shows overall scheme of the active attentional sampling method according to the present invention. Referring to FIG. 1, in order to obtain active sampling mask for accelerating background subtraction, this invention uses three properties of foreground, i.e., temporal, spatial and frequency properties (C1).

The temporal property is that a pixel is more likely to belong to the foreground region if it has been a foreground pixel previously. The spatial property is that a pixel has a high probability of being a foreground pixel if its surrounding pixels are of the foreground, in which the probability of foreground is proportional to the number of surrounding foreground pixels. The frequency property is that if foreground/background index of a pixel is changed very frequently, then the pixel is more likely to be a noise or dynamic background region whereas the probability of belonging to the foreground region is low.

Then, a foreground probability map $P_{FG}$ is generated based on the temporal, spatial and frequency properties (C2). Update is desirably achieved for all frames by the foreground probability map $P_{FG}^{t-1}$.

Further, sampling is performed after generating the foreground probability map. In the present invention, randomly scattered sampling (C3), spatially expanding importance sampling (C4) and surprise pixel sampling (C5) are used.

Then, In the present invention sampling masks are desirably generated for all frames (C6). By using the sampling mask $M^t$, selective pixel-wise background subtraction is performed only for the pixels of $M^t(n)=1$ (where, n is pixel index). The sampling mask does not render any restriction pixel-wise background subtractions which perform thereafter. Therefore, the sampling mask may be combined with any kinds of pixel-wise background subtraction technology.

Further, background subtraction is searching process of detection mask sequence $\{D^1, \ldots, D^t\}$ by using a video frame sequence $\{I^1, \ldots, I^t\}$ and sampling mask $\{M^1, \ldots, M^t\}$. The detection mask at pixel n shall be denoted with the symbol $D(n)$. The $D(n)=0$ if pixel n belongs to the background and $D(n)=1$ if pixel n belongs to the foreground. Each video image $I^t$, sampling mask $M^t$ and detection mask $D^t$ are composed of N pixels $\{I^t(1), \ldots, I^t(N)\}$, $\{M^t(1), \ldots, M^t(N)\}$ and $\{D^t(1), \ldots, D^t(N)\}$ respectively. All the masks are binary masks. In the present invention, selective pixel-wise background subtraction is performed only for the pixels of $M^t(n)=1$.

Referring to FIGS. 1 to 8, the design of active attentional sampling for accelerating background subtraction from foreground characteristic video shall be described below by each process (C1-C6).

First, estimation of foreground properties shall be obtained in order to generate foreground probability map $P_{FG}$ (C1). In the present invention, estimation models are proposed to measure the temporal, spatial and frequency properties of each pixel. The three property measures are denoted as $\{M_T, M_S, M_F\}$. The temporal property measure $M_T$ is estimated by the recent history of detection results. The spatial property measure $M_S$ is estimated by the number of foreground pixels around each pixel. Further, the frequency property measure $M_F$ is estimated by the ratio of flipping over of the detection results in a period of time.

All the estimation model are updated by a moving average method, with running rate of $\alpha_T$, $\alpha_F$ and $\alpha_S$. All the learning rates are between 0 and 1. The estimation models for the measures of the properties are given in the following.

The temporal property measure $M_T$: At each location n, a recent history of detection mask results at that location are averaged to estimate the temporal property measure $M_T$. The temporal property measure $M_T$ is shown as Equation 1.

$$M_T^t(n) = (1-\alpha_T) M_T^{t-1}(n) + \alpha_T D^t(n) \tag{Eq. 1}$$

In the Equation 1, as the value of $M_T^t$ comes close to 1, the possibility of foreground appearance at the pixel is high.

The spatial property measure $M_S$: Detection results of nearby pixels are used to measure the spatial coherency of each pixel n. The spatial property measure $M_S$ is shown as Equation 2.

$$M_S^t(n) = (1-\alpha_S) M_S^{t-1}(n) + \alpha_S s^t(n), \tag{Eq. 2}$$

$$\left( s^t(n) = \frac{1}{w^2} \sum_{i \in N(n)} D^t(i) \right)$$

In the Equation 2, $N(n)$ denotes a spatial neighborhood around pixel n (i.e., w×w square region centered at n), and $M_S^t$ closer to 1 represents higher probability of belonging to foreground.

The frequency property measure $M_F$: If detection results have been changed twice during previous three frames, we consider it as a clue of dynamic scene. The frequency property measure $M_F$ is shown as Equation 3.

$$M_F^t(n) = (1-\alpha_F)M_F^{t-1}(n) + \alpha_F f^t(n), \quad \text{(Eq. 3)}$$

$$f^t(n) = \begin{cases} 1 & (D^{t-1}(n) \neq D^{t-1}(n)) \ \& \ (D^{t-1}(n) \neq D^t(n))) \\ 0 & \text{otherwise} \end{cases}$$

In the Equation 3, $f^t(n)$ denotes a frequently changing property at pixel n. Unlike the other measures, the pixel n has higher probability of being stable foreground as the value $M_F^t$ comes closer to 0.

Next, the foreground probability map $P_{FG}$ shall be generated (C2). By estimating the three foreground properties, three measurements $M_T$, $M_S$, $M_F$ are obtained. Every measurement has a value between 0 and 1, which corresponds to probability of the pixel belonging to foreground. By using these measurements, the foreground probability for a pixel n at frame t can be defined as Equation 4.

$$P_{FG}^t(n) = M_T^t(n) \times M_S^t(n) \times (1 - M_F^t(n)) \quad \text{(Eq. 4)}$$

The foreground probability map $P_{FG}^t$ is a composition of $\{P_{FG}^t(n)\}_{n=1}^N$.

Next, active sampling mask $M^t$ shall be obtained (C6). In the present invention, the sampling mask $M^t$ is obtained by a combination of three masks by a pixel-wise OR operation ($\oplus$), as shown in Equation 5.

$$M^t = M_{RS}^t \oplus M_{SEI}^t \oplus M_{SP}^t \quad \text{(Eq. 5)}$$

In the Equation 5, $M_{RS}^t$, $M_{SEI}^t$ and $M_{SP}^t$ are sampling masks of randomly scattered sampling ($S_{RS}$, C3), spatially expanding importance sampling ($S_{SEI}$, C4) and surprise pixel sampling ($S_{SP}$, C5) respectively.

At each sampling stage, the sampling masks are generated based on the foreground probability map $P_{FG}$ and foreground detection result D. In the present invention, the sampling masks for active attentional sampling $M_{RS}$, $M_{SEI}$ and $M_{SP}$ can be designed as shown in Equation 6.

$$M_{RS}^t = S_{RS}^t(M_{RS}^{t-1}, D^{t-1}, P_{FG}^{t-1})$$

$$M_{SEI}^t = S_{SEI}^t(M_{RS}^t, P_{FG}^{t-1})$$

$$M_{SP}^t = S_{SP}^t(M_{RS}^t, D^{t-1}, P_{FG}^{t-1}) \quad \text{(Eq. 6)}$$

Figure 2:
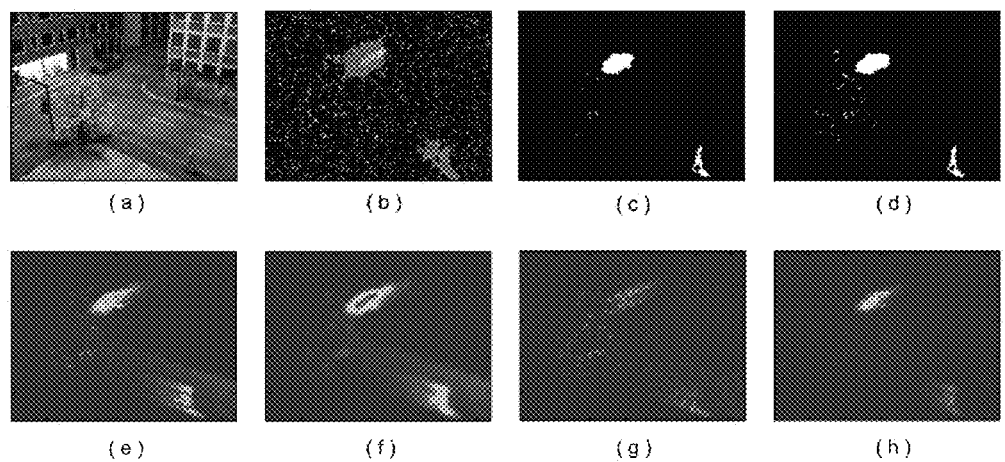
FIG. 2 shows foreground property measurements, corresponding active attentional sampling mask and foreground detection results.

FIG. 2 shows foreground property measurements, corresponding active attentional sampling mask and foreground detection results.

FIG. 2(a) shows an image of current input video. FIG. 2(b) shows the active attentional mask used for background subtraction. In FIG. 2(b), white pixels represent randomly scattered sampling mask $M_{RS}^t$, blue pixels represent spatially expanding importance sampling mask $M_{SEI}^t$, and red pixels represent surprise pixel sampling mask $M_{SP}^t$. As shown in FIG. 2(b) most regions are marked as black, which means most of masks $M^t$ become zero. By removing redundancy as shown above, the mask optimizes the necessary computation load in subsequent process.

FIG. 2(c) shows foreground detection result by GMM algorithm with the active attentional sampling mask according to the present invention. FIG. 2(d) shows foreground detection result by GMM algorithm for all pixels of the input video, i.e., without the active attentional sampling mask. FIGS. 2(e) to 2(g) show temporal property $M_T^t$, spatial property $M_S^t$ and frequency property $M_F^t$ which are obtained from the input video of FIG. 2(a). FIG. 2(h) shows foreground probability map $P_{FG}$ which are obtained from the temporal, spatial and frequency properties. By comparing FIG. 2(a) and FIG. 2(h), it is shown that the foreground probability map $P_{FG}$ is well consistent with the foreground objects (car, human) in the input video.

Then, randomly scattered sampling (C3), spatially expanding importance sampling (C4), and surprise pixel sampling (C5) are described in detail.

First, the randomly scattered sampling (C3) is described. The 100*ρ% pixels of the entire pixels are selected through randomly scattered sampling. The ρ value is preferably set between 0.05 and 0.1. Uniform random sampling approximates that every pixel is checked probabilistically on average once among 1/ρ frames. The number of the random samples ($N_S$) is ρN. The number is constant for all frames.

However, some of the random points which are generated in the previous frames are preferably preserved. The determination of these points are based on the amount of information which are measured by the foreground probability $P_{FG}^{t-1}$. A sample point n at which $M_{RS}^{t-1}(n) = D^{t-1}(n) = 1$ is used again in current frame ($M_{RS}^t(n) = 1$). Therefore, the number of reused samples $N_{reuse}$ changes adaptively. Then, $N_S - N_{reuse}$ samples are randomly re-sampled across the entire image.

Next, the spatially expanding importance sampling (C4) is described. The randomly scattered sampling mask $M_{RS}^t$ is too sparse to construct a complete foreground region and might miss small objects. Therefore, it is necessary to fill the void space between sparse points in the foreground region. In order to fill the space, importance sampling is adopted in the present invention in which only necessary region is focused compactly.

Conventional importance sampling draws samples densely where the importance weight is high. In the present invention, the sampling mask should cover all of the foreground pixels. Therefore, the dense sampling is unenough in the foreground region because duplicated sampling of the same pixels cannot fill the void space.

Figure 3:
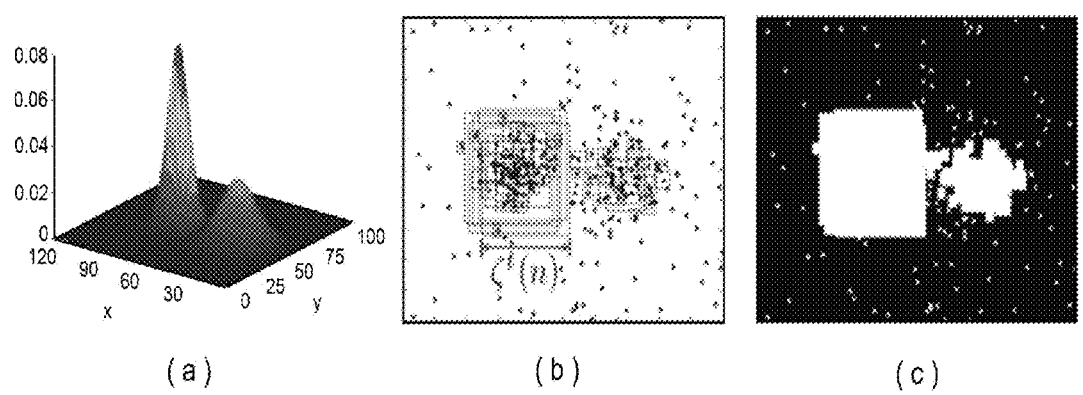
FIG. 3 shows spatially expanding importance sampling according to the present invention.

In order to overcome this full coverage sampling problem, the present invention proposes spatially expanding importance sampling method, in which the sampling area expands in proportion to the importance weight at every point of $M_{RS}^t = 1$ as shown in FIG. 3.

FIG. 3 shows spatially expanding importance sampling according to the present invention, in which the spatially expanding importance sampling mask $M_{SEI}$ is generated by foreground probability map $P_{FG}$ FIG. 3(a) shows an example of the foreground probability map $P_{FG}$. FIG. 3(b) shows a spatially expanding region width $\zeta_s$ which is calculated for each point of random sampling mask $M_{RS}$. FIG. 3(c) shows the spatially expanding importance sampling mask $M_{SEI}$ which is generated by setting all the inside points of the square to 1.

The randomly sampled mask $M_{RS}^t$ is too sparse to construct a complete foreground region and might miss small objects. It is therefore necessary to fill the space between sparse points in the foreground region. In order to fill the space, an appropriate importance sampling solution which may compactly focus only on necessary region is developed in the present invention. Conventional importance sampling draws samples densely where the importance weight is high. In the present invention, the sampling mask should cover all of the foreground pixels and so the dense sampling is not enough in the foreground region. To solve this full coverage sampling problem, there is proposed a spatially expanding importance sampling method which expands the sampling area proportional to the importance weight at every point of $M_{RS}^t = 1$ as shown in FIG. 3.

The shape of the expanded region is a square with width of $\zeta^t$ which depends on the importance weight at i-th randomly scattered sample. Even though the square regions are overlapped, they are depicted by one region with $M_{SEI}^t=1$ as shown in FIG. 3.

If the distribution is assumed as uniform, the importance weight of each randomly scattered sample i (where $M_{RS}^t(i)=1$) becomes $r^t(i)=P_{FG}^t(i)$. That is, proportional to $r^t(i)$, the sampling region N(i) is expanded with size of $\zeta^t(i) \times \zeta^t(i)$ centered at pixel i, which is as shown in Equation 7.

$$M_{SEI}^t(N(i))=1 \quad \text{(Eq. 7)}$$

In the Equation 7, the spatially expanding width $\zeta^t(i)$ is determined by Equation 8.

$$\zeta^t(i) = \text{round}(r^t(i) \times \omega_s) \quad \text{(Eq. 8)}$$
$$\omega_s = k\sqrt{\frac{N}{N_s}}$$

In the Equation 8, $\omega_s$ is an expanding constant with parameter k (usually k is $\sqrt{3}$ or $\sqrt{5}$).

Figure 4:
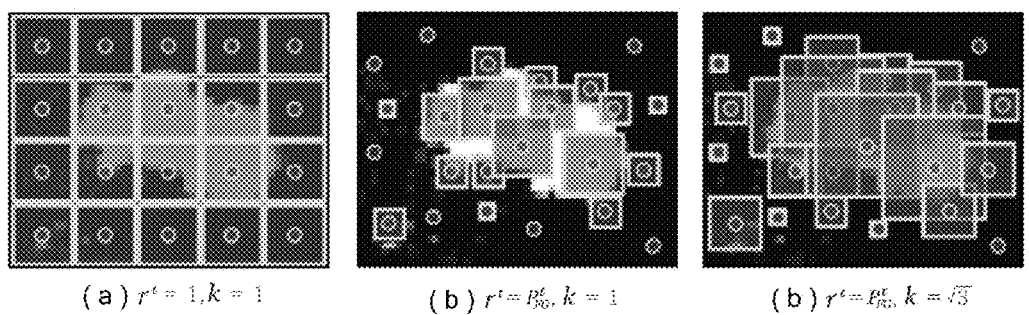
FIG. 4 shows how the parameter $\omega_s$ of spatially expanding importance sampling is designed and is affected by the parameter k.

FIG. 4 shows how the parameter $\omega_s$ of spatially expanding importance sampling is designed, and is affected by the parameter k.

As shown in FIG. 4(a), $\omega_s$ with k=1 and $r^t=1$ implies a width of one square under an assumption that the image is equally decomposed into $N_S$ squares centered at regularly distributed $N_S$ samples. However, in actual situation, the $N_S$ samples are not distributed regularly and most of $r^t$ are less than 1. Therefore, the sampling mask $M_{SEI}^t$ cannot cover the estimated foreground region compactly, as shown in FIG. 4(b). Referring to FIG. 4(c), the parameter k (larger than 1) expands the sampling masks so that the masks compactly cover the foreground region. As shown in FIG. 2(b), high foreground probability regions are widely sampled and most of $\zeta^t$ are 0 in low probability region.

Next, the surprise pixel sampling (C5) is described. Even if the foreground probability is correctly estimated, the foreground detection still has intrinsic unpredictability. Abnormal foreground is caused by suddenness. For example, a person or a car may suddenly appear from a new direction, or a thief may enter into a restricted area. However, these surprisingly appearing moving objects should be detected successfully. In addition, rarely appearing very fast moving objects could be lost, because the spatially expanded region may not be wide enough.

The randomly scattered samples become important in capturing these unpredictable cases. A pixel is defined as a surprise pixel when it is foreground in the previous frame even though its foreground probability is small. Because the foreground object is not expected to exist there, the observation of foreground pixel is very surprising. So by widening the sampling area around the pixel, new foreground pixels can be found in a current frame.

For pixel i (where $M_{RS}^t(i)=1$), surprise pixel index $\zeta^t(i)$ is given by Equation 9.

$$\xi^t(i) = \begin{cases} 1 & (P_{FG}^{t-1}(i) < \theta_{th}^{t-1}) \ \& \ (D^{t-1}(i)=1) \\ 0 & \text{otherwise} \end{cases} \quad \text{(Eq. 9)}$$

$$\theta_{th}^{t-1} = \max\left(\frac{P_{FG}^{t-1}}{\omega_s}\right)$$

The surprise pixel sampling mask is generated as $M_{SP}^t(N(i))=1$ for N(i) region ($\omega_s \times \omega_s$ region centered at i if $\zeta^t(i)=1$).

The performance of the present invention is evaluated for several video sequences of various resolutions and situations in order to prove its practical applicability. The results are compared with the conventional background subtraction methods.

The active attentional sampling technology of the present invention is implemented in C++ for simulation with Intel Core i7 2.67 GHz processor and 2.97 GB RAM. In order to prove its efficiency, throughout the whole experiments, the processing is computed in a sequential way in a single core, without adopting any kind of parallel processing skills such as GPUs, OpenMP, pthread, and SIMD (single instruction multiple data). The parameters of background subtraction methods are optimized one by one for various videos, but the parameters of the present invention are the same regardless of combining detection methods and testing videos, as below: $\alpha_T=0.1$, $\alpha_F=0.01$, $\alpha_S=0.05$, $\rho=0.05$ and k=$\sqrt{3}$.

Figure 5:
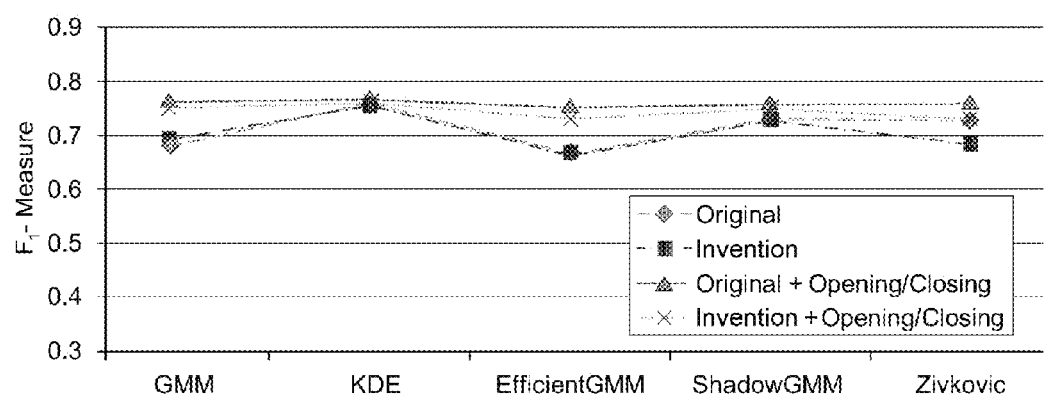
FIG. 5 shows an average of each frame's F1-Measure over whole sequences by various background subtraction methods.

FIG. 5 shows an average of each frame's F1-Measure over whole sequences by various background subtraction methods. It is shown that the present invention can be successfully combined with various background subtraction methods without degrading the performance of post image processing.

Referring to FIG. 5, when adopting the active attentional sampling of the present invention, the background subtraction performance is still maintained. In this specification SABS video is used in order to check whether background subtraction performance degrades when adopting the active attentional sampling. SABS dataset is an artificial dataset for pixel-wise evaluation of background subtraction method. For every frame of each test sequence, ground-truth annotation is provided as foreground masks. Even though it is generated artificially, there are realistic scenarios such as light reflection, shadows, traffic lights and waving trees. The correctness of foreground detection is expressed by F1-Measure which is a harmonic mean of recall and precision. Considering that the best F1-Measure is only 0.8, SABS datasets are difficult enough to evaluate the performance of background subtraction algorithm. It is identified that background subtraction performance is never degraded when adopting the active attentional sampling of the present invention.

Figure 6:
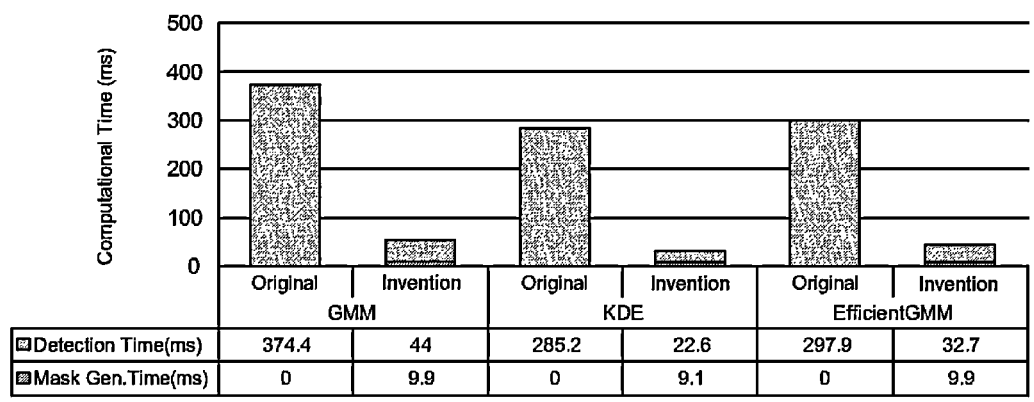
FIG. 6 shows computation time speed-up according to the present invention.
Figure 6:
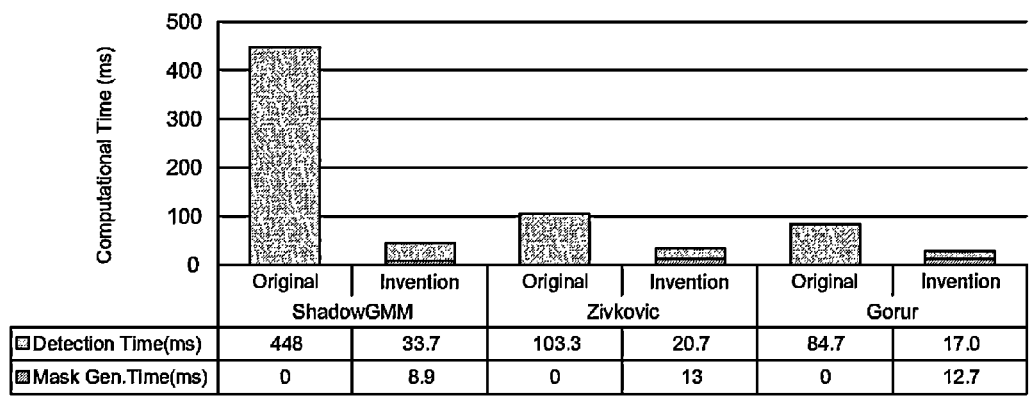

FIG. 6 shows computation time speed-up according to the present invention. The active attentional sampling of the present invention significantly reduces the computation load for the background subtraction, which shortens the detection time on average 6.6 times. FIG. 6 reveals that fast detection algorithms show relatively smaller speed-up than computationally heavy algorithms. This is due to the mask generation time, which becomes relatively large when comparing with the detection time reduction. The tests were performed with full HD videos. For computationally heavy algorithms such as GMM, shadow GMM and KDE, the speed-up ratio is approximately 8.5. For fast detection algorithms such as Zivkovic and Gorur, the speed-up ratio is approximately 3.

Figure 7:
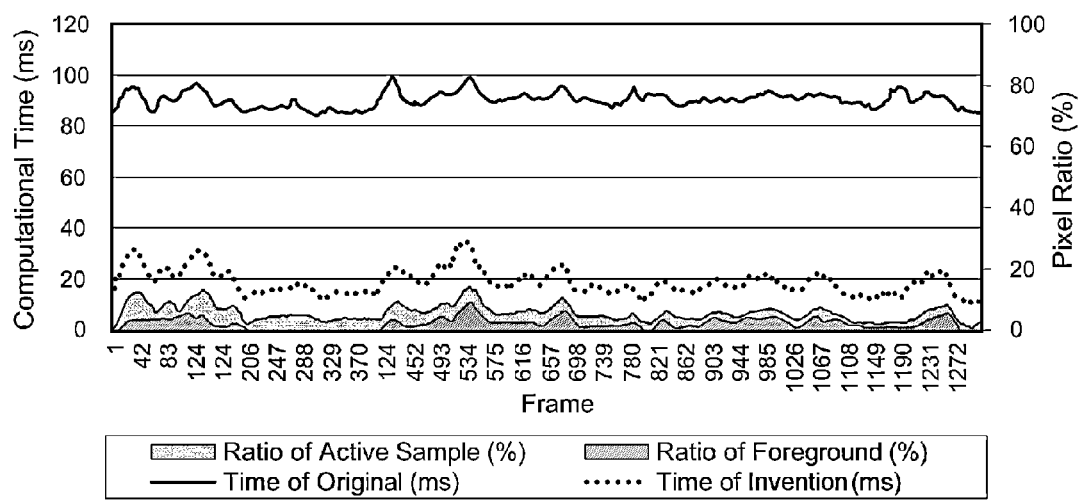
FIG. 7 shows computation time changes for overall frames according to the present invention.

FIG. 7 shows computation time changes for overall frames according to the present invention, in which GMM method is used for SABS video. The computational time of the present invention increases as the ratio of foreground region becomes large. However, the original GMM also takes more time when the foreground region becomes large. Therefore, the ratio of speedup is maintained uniformly. In FIG. 7, the foreground region varies from 0% to 10% in the input video. Then, the computation time increases in the present invention as well as the conventional detection algorithms as the ratio of foreground region increases.

Figure 8:
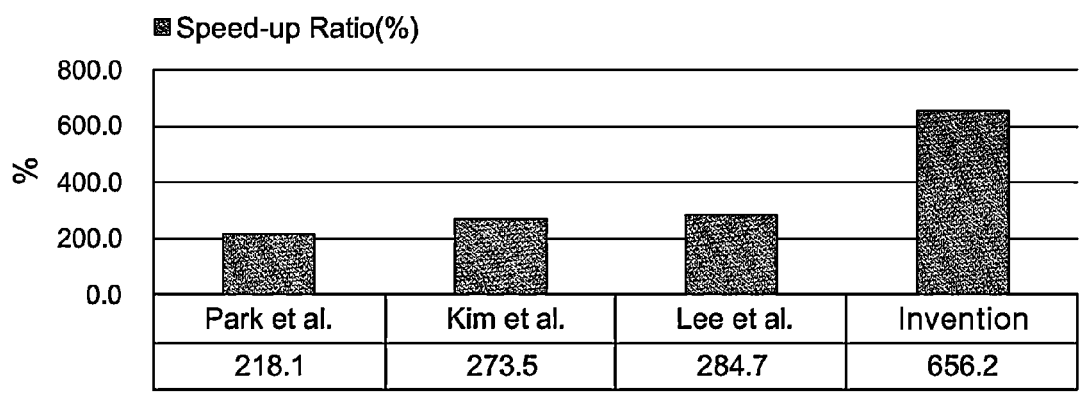
FIG. 8 shows average speed-up performance according to the present invention.

FIG. 8 shows average speed-up performance according to the present invention, in which the present invention outperforms the conventional sampling techniques. In FIG. 8, the computational complexity reduction performance of the present invention is compared with similar selective sampling-based methods; i.e. Park et al., Kim et al. and Lee et al. All speed-up performance data are based on the optimized values in each paper. The conventional techniques are pre-designed regardless of video situation, which renders many unnecessary samplings and redundant calculations being inevitable because of the regularly designed sampling pattern. The sampling strategy of the present invention is totally different from the grid pattern based subsampling approach. The probabilistic sampling approach of the present invention is more adaptive to various video situations and becomes more efficient by eliminating redundant calculations.

Therefore, by adopting the active attentional sampling method of the present invention, the real-time detection in full-HD video is enabled. In conventional technology, using GPU is allegedly the only solution of real-time background subtraction in full-HD video. However, as shown in Table 2, the present invention makes it possible for the conventional pixel-wise background subtraction methods to be used for high resolution video in real-time fashion. The experiments are performed with GeForce GTS250 (128 CUDA cores) for GPU version and a single core processor for the others. Every detection method is applied to a full-HD video (1920×1080) with optimal parameters and detection time is measured with and without the present invention, separately.

TABLE 2

| Detection Algorithm | Original (FPS) | The Present Invention (FPS) |
|---|---|---|
| GPU | 78.9 | — |
| GMM | 1.6 | 18.6 |
| KDE | 3.5 | 31.5 |
| Efficient GMM | 3.4 | 23.5 |
| Shadow GMM | 2.2 | 23.5 |
| Zivkovic | 9.7 | 29.7 |
| Gorur | 11.8 | 33.7 |

According to the present invention, the background subtraction is accomplished by generating active attentional sampling mask for input video and then processing each frame of the input video only for regions corresponding to the sampling mask, which renders the background subtraction be much accelerated. That is, the present invention successfully speeds up pixel-wise background subtraction methods approximately 6.6 times without deteriorating detection performance. Therefore, according to the present invention, real-time detection with full-HD video is successfully achieved through various conventional background subtraction algorithms.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

What is claimed is:

1. An active attentional sampling method for accelerating background subtraction for video, comprising steps of:
(a) obtaining temporal property, spatial property and frequency property of foreground for the video in order to obtain active sampling mask for accelerating background subtraction;
(b) generating foreground probability map $P_{FG}$ based on the temporal, spatial and frequency properties; and
(c) generating sampling mask $M^t$ for each frame based on the foreground probability map $P_{FG}$ and detection mask D which is the result of foreground detection so as to perform selective pixel-wise background subtraction for the sampling mask $M^t$.

2. The method according to claim 1, wherein the detection mask D is obtained by searching detection mask sequence $\{D^1, \ldots, D^t\}$ using video frame sequence $\{I^1, \ldots, I^t\}$ and sampling mask $\{M^1, \ldots, M^t\}$.

3. The method according to claim 1, wherein the step (c) comprises: generating the foreground probability map $P_{FG}$; and adopting randomly scattered sampling (C3), spatially expanding importance sampling (C4) and surprise pixel sampling (C5) to the foreground probability map $P_{FG}$.

4. The method according to claim 3, wherein the step (a) comprises:
estimating foreground property for generating the foreground probability map $P_{FG}$;
estimating temporal property measure $M_T$ by the recent history of detection results;
estimating spatial property measure $M_S$ by the number of foreground pixels around each pixel; and
estimating frequency property measure $M_F$ by the ratio of flipping over of the detection results in a period of time.

5. The method according to claim 4, wherein the step (a) further comprises:
updating the temporal property measure $M_T$, the spatial property measure $M_S$ and the frequency property measure $M_F$ by adopting moving average with the learning rate of $\alpha_T$, $\alpha_S$ and $\alpha_F$.

6. The method according to claim 5, wherein the temporal property measure $M_T$ at each location n is calculated by $$M_T^t(n) = (1-\alpha_T)M_T^{t-1}(n) + \alpha_T D^t(n),$$

where $M_T^t$ closer to 1 represents higher possibility of foreground appearance at the pixel.

7. The method according to claim 6, wherein the spatial property measure $M_S$ at each location n is calculated by $$M_S^t(n) = (1-\alpha_S)M_S^{t-1}(n) + \alpha_S s^t(n), \left(s^t(n) = \frac{1}{w^2}\sum_{i \in N(n)} D^t(i)\right),$$

where $N(n)$ denotes a spatial neighborhood around the pixel n, which is w×w square region centered at n, and $M_S^t$ closer to 1 represents higher probability of belonging to the foreground.

8. The method according to claim 7, wherein the frequency property measure $M_F$ at each location n is calculated by $$M_F^t(n) = (1-\alpha_F)M_F^{t-1}(n) + \alpha_F f^T(n),$$

$$f^t(n) = \begin{cases} 1 & (D^{t-1}(n) \neq D^{t-1}(n)) \& (D^{t-1}(n) \neq D^t(n)) \\ 0 & \text{otherwise} \end{cases},$$

where f'(n) denotes a frequently changing property at the pixel n, and $M_F^t$ closer to 0 represents higher probability of belong to the foreground.

9. The method according to claim 5, wherein the step (b) comprises:
　obtaining three measurements $M_T$, $M_S$, $M_F$ by estimating the foreground properties; and
　generating the foreground probability map $P_{FG}{}^t$ by calculating the foreground probability for a pixel n at frame t by $$P_{FG}{}^t(n)=M_T{}^t(n) \times M_S{}^t(n) \times (1-M_F{}^t(n)).$$

10. The method according to claim 9, wherein the step (c) comprises generating the sampling mask $M^t$ of the active sampling mask by $$M^t = M_{RS}{}^t \oplus M_{SEI}{}^t \oplus M_{SP}{}^t,$$

where the $M_{RS}{}^t$, $M_{SEI}{}^t$ and $M_{SP}{}^t$ are sampling masks of the randomly scattered sampling (C3), the spatially expanding importance sampling (C4), and surprise pixel sampling (C5), respectively.

11. The method according to claim 10, where the $M_{RS}{}^t$, $M_{SEI}{}^{t\ and\ M}{}_{SP}{}^t$ are calculated by $$M_{RS}{}^t = S_{RS}{}^t(M_{RS}{}^{t-1}, D^{t-1}, P_{FG}{}^{t-1})$$

$$M_{SEI}{}^t = S_{SEI}{}^t(M_{RS}{}^t, P_{FG}{}^{t-1})$$

$$M_{SP}{}^t = S_{SP}{}^t(M_{RS}{}^t, D^{t-1}, P_{FG}{}^{t-1}).$$

12. A computer-readable non-transitory recording medium storing a program for executing an active attentional sampling method for accelerating background subtraction, comprising steps of
　(a) obtaining temporal property, spatial property and frequency property of foreground for the video in order to obtain active sampling mask for accelerating background subtraction;
　(b) generating foreground probability map $P_{FG}$ based on the temporal, spatial and frequency properties; and
　(c) generating sampling mask $M^t$ for each frame based on the foreground probability map $P_{FG}$ and detection mask D which is the result of foreground detection so as to perform selective pixel-wise background subtraction for the sampling mask $M^t$.

13. The computer-readable non-transitory recording medium according to claim 12, wherein the detection mask D is obtained by searching detection mask sequence $\{D^1, \ldots, D^t\}$ using video frame sequence $\{I^1, \ldots, I^t\}$ and sampling mask $\{M^1, \ldots, M^t\}$.

14. The computer-readable non-transitory recording medium according to claim 12, wherein the step (c) comprises: generating the foreground probability map $P_{FG}$; and adopting randomly scattered sampling (C3), spatially expanding importance sampling (C4) and surprise pixel sampling (C5) to the foreground probability map $P_{FG}$.

15. The computer-readable non-transitory recording medium according to claim 14, wherein the step (a) comprises:
　estimating foreground property for generating the foreground probability map $P_{FG}$;
　estimating temporal property measure $M_T$ by the recent history of detection results;
　estimating spatial property measure $M_S$ by the number of foreground pixels around each pixel; and
　estimating frequency property measure $M_F$ by the ratio of flipping over of the detection results in a period of time.

16. The computer-readable non-transitory recording medium according to claim 15, wherein the step (a) further comprises:
　updating the temporal property measure $M_T$, the spatial property measure $M_S$ and the frequency property measure $M_F$ by adopting moving average with the learning rate of $\alpha_T$, $\alpha_S$ and $\alpha_F$.

17. The computer-readable non-transitory recording medium according to claim 16, wherein the temporal property measure $M_T$ at each location n is calculated by $$M_T{}^t(n) = (1-\alpha_T) M_T{}^{t-1}(n) + \alpha_T D^t(n),$$

where $M_T{}^t$ closer to 1 represents higher possibility of foreground appearance at the pixel.

18. The computer-readable non-transitory recording medium according to claim 17, wherein the spatial property measure $M_S$ at each location n is calculated by $$M_S^t(n) = (1-\alpha_S) M_S^{t-1}(n) + \alpha_S s^t(n), \left( s^t(n) = \frac{1}{w^2} \sum_{i \in N(n)} D^t(i) \right),$$

where N(n) denotes a spatial neighborhood around the pixel n, which is w×w square region centered at n, and $M_S{}^t$ closer to 1 represents higher probability of belonging to the foreground.

19. The computer-readable non-transitory recording medium according to claim 18, wherein the frequency property measure $M_F$ at each location n is calculated by $$M_F^t(n) = (1-\alpha_F) M_F^{t-1}(n) + \alpha_F f^t(n),$$

$$f^t(n) = \begin{cases} 1 & (D^{t-1}(n) \neq D^{t-2}(n)) \ \& \ (D^{t-1}(n) \neq D^t(n))) \\ 0 & \text{otherwise} \end{cases},$$

where $f^t(n)$ denotes a frequently changing property at the pixel n, and $M_F{}^t$ closer to 0 represents higher probability of belong to the foreground.

20. The computer-readable non-transitory recording medium according to claim 16, wherein the step (b) comprises:
　obtaining three measurements $M_T$, $M_S$, $M_F$ by estimating the foreground properties; and
　generating the foreground probability map $P_{FG}{}^t$ by calculating the foreground probability for a pixel n at frame t by $$P_{FG}{}^t(n) = M_T{}^t(n) \times M_S{}^t(n) \times (1-M_F{}^t(n)).$$

21. The computer-readable non-transitory recording medium according to claim 20, wherein the step (c) comprises generating the sampling mask $M^t$ of the active sampling mask by $$M^t = M_{RS}{}^t \oplus M_{SEI}{}^t \oplus M_{SP}{}^t,$$

where the $M_{RS}{}^t$, $M_{SEI}{}^t$ and $M_{SP}{}^t$ are sampling masks of the randomly scattered sampling (C3), the spatially expanding importance sampling (C4), and surprise pixel sampling (C5), respectively.

22. The computer-readable non-transitory recording medium according to claim 21, where the $M_{RS}{}^t$, $M_{SEI}{}^t$ and $M_{SP}{}^t$ are calculated by $$M_{RS}{}^t = S_{RS}{}^t(M_{RS}{}^{t-1}, D^{t-1}, P_{FG}{}^{t-1})$$

$$M_{SEI}{}^t = S_{SEI}{}^t(M_{RS}{}^t, P_{FG}{}^{t-1})$$

$$M_{SP}{}^t = S_{SP}{}^t(M_{RS}{}^t, D^{t-1}, P_{FG}{}^{t-1}).$$

\* \* \* \* \*